(12) United States Patent  
Canella et al.

(10) Patent No.: US 7,561,683 B2  
(45) Date of Patent: Jul. 14, 2009

(54) METHOD FOR MEASURING RESISTANCE FOR A SUBSCRIBER LINE INTERFACE CIRCUIT USING A PROTECTIVE CIRCUIT

(75) Inventors: Alberto Canella, Villach (AT); Gerhard Nössing, Villach (AT)

(73) Assignee: Infineon Technologies AG, Munich (DE)

( * ) Notice: Subject to any disclaimer, the term of this patent is extended or adjusted under 35 U.S.C. 154(b) by 849 days.

(21) Appl. No.: 11/089,044

(22) Filed: Mar. 24, 2005

(65) Prior Publication Data

US 2005/0238165 A1 Oct. 27, 2005

(30) Foreign Application Priority Data

Mar. 24, 2004 (DE) ............... 10 2004 014 449

(51) Int. Cl.
*H04M 1/00* (2006.01)
*H04M 9/00* (2006.01)

(52) U.S. Cl. .................................. 379/412; 379/24
(58) Field of Classification Search .......... 379/24, 379/412

See application file for complete search history.

(56) References Cited

U.S. PATENT DOCUMENTS 4,320,338 A * 3/1982 Morris et al. ............ 324/678
6,169,784 B1   1/2001 Smith
6,434,232 B1   8/2002 Ludeman

FOREIGN PATENT DOCUMENTS

CN 85101415 10/1986
CN 1280415 A 1/2001

* cited by examiner

Primary Examiner—Alexander Jamal
(74) Attorney, Agent, or Firm—Maginot, Moore & Beck

(57) ABSTRACT

The invention relates to a method for ascertaining a resistance value (Z) between a first contact (2) and a second contact (3) in a subscriber line interface circuit (4), where a protective circuit (9) for protecting the subscriber line interface circuit (4) against overvoltages is provided between the two contacts (2, 3) and comprises a parallel circuit containing a protective capacitor (5) with two resistors (7, 8) connected in series via a node (K), the node (K) being connected to a third contact (10) in the subscriber line interface circuit (4), where the method has the following steps: a predetermined charging voltage ($U_{Charge}$) is applied to the protective capacitor (5); a threshold voltage ($U_{TH}$) is calculated on the basis of the resistance values ($R_1$, $R_2$) of the two resistors (7, 8) and the applied charging voltage ($U_{Charge}$); a measured voltage ($U_M$) tapped off across one of the two resistors (7, 8) is measured while the protective capacitor (5) is discharging; the measured voltage ($U_M$) is compared with the calculated threshold voltage ($U_{TH}$); a period ($\Delta t$) between the start of the discharging of the protective capacitor (5) and the time at which the measured voltage ($U_M$) is the same as the threshold voltage ($U_{TH}$) is ascertained; and the resistance value (Z) is calculated using the ascertained period ($\Delta t$) and the resistance values ($R_1$, $R_2$) of the two resistors (7, 8).

11 Claims, 5 Drawing Sheets

METHOD FOR MEASURING RESISTANCE FOR A SUBSCRIBER LINE INTERFACE CIRCUIT USING A PROTECTIVE CIRCUIT

CROSS-REFERENCE TO RELATED APPLICATIONS

This application claims priority to German Patent Application No. 10 2004 014 449.4, filed Mar. 24, 2004.

FIELD OF THE INVENTION

The invention relates to a method for measuring resistance for a subscriber line interface circuit using a protective circuit.

BACKGROUND

The technical field of the invention relates to line cards (line card systems) or subscriber line interface circuits, the basic function of which is to transmit the encoded voice signals from a digital PCM interface onto the line (and vice versa). In this case, the line, comprising a tip wire and a ring wire or A wire and B wire, needs to be operated using low-frequency programmable voltages.

In addition, the line card has the function of monitoring the signals on the line and external circuits without using a specially provided test unit. By way of example, it is an aim to measure the unknown resistance between the ring wire and ground (or between the tip wire and ground or between the tip wire and the ring wire) with a predefined level of precision (typically 10%). In the case of known methods for measuring the resistance between the ring wire and ground (the same applies to measurements of the resistance between the ring wire and the tip wire and between the tip wire and ground), the line card needs to be put into a defined measurement mode in which, by way of example, the ring wire has a predefined potential (for example –50 V) applied to it. In a subsequent step, the current flowing between the ring wire and ground is measured by a control unit on the line card. The resistance between the ring wire and ground is calculated from the quotient of the predetermined voltage and the measured current.

A drawback of this known method is that a critical signal-to-noise ratio for the current measurement arises if the resistance which is to be measured is greater than 2 MΩ. At a predetermined potential of –50 V, the current to be measured would then be 25 μA. The high signal-to-noise ratio which arises means that this current level is too low to be able to be measured with sufficient accuracy. From time to time, a tolerance of 10% might no longer be ensured. However, such a tolerance of no more than 10% is demanded by the telecommunication companies in some countries (e.g. Telecom Italia).

The aforementioned problem could be solved by using larger transistors for the subscriber line interface circuit, which are known to have better signal-to-noise ratio characteristics. However, the use of larger transistors would significantly increase the chip area for the line card, which would not be in keeping with a required level of large-scale integration for the components in the subscriber line interface circuit.

SUMMARY

The object of the present invention is therefore to provide a simple and inexpensive method for measuring resistance for a subscriber line interface circuit which allows even large resistances to be measured with a high level of precision.

The idea on which the present invention is based is essentially to provide a method for ascertaining a resistance value between a first contact and a second contact in a subscriber line interface circuit, where a protective circuit for protecting the subscriber line interface circuit against overvoltages is provided between the two contacts and comprises a parallel circuit containing a protective capacitor with two resistors connected in series via a node, the node being connected to a third contact in the subscriber line interface circuit, where the method has the following steps:

a) a predetermined charging voltage is applied to the protective capacitor;

b) a threshold voltage is calculated on the basis of the resistance values of the two resistors and the applied charging voltage;

c) a measured voltage tapped off across one of the two resistors is measured while the protective capacitor is discharging;

d) the measured voltage is compared with the calculated threshold voltage;

e) a period between the start of the discharging of the protective capacitor and the time at which the measured voltage is the same as the threshold voltage is ascertained; and f) the resistance value is calculated using the ascertained period and the resistance values of the two resistors.

One advantage of the present invention is that the invention's measurement method means that it is also possible to measure large resistances with a high level of precision, since no critical signal-to-noise ratio arises for this measurement method. Accordingly, the inventive measurement method is highly sensitive and can also be used for signaling purposes.

In line with one preferred development, the first contact connects a tip wire and the second contact connects a ring wire to the subscriber line interface circuit, so that the resistance value between the ring wire and the tip wire is determined.

In line with a further preferred development, the first contact connects the ring wire and the second contact connects ground to the subscriber line interface circuit, so that the resistance value between the ring wire and ground is determined.

In line with a further preferred development, the first contact connects the tip wire and the second contact connects ground to the subscriber line interface circuit, so that the resistance value between the tip wire and ground is determined.

In line with a further preferred development, the threshold voltage is calculated using an internal control device in the subscriber line interface circuit or an external control device.

One advantage of this preferred development is that both internal resources in the subscriber line interface circuit and external resources may be used for calculating the threshold voltage.

In line with a further preferred development, the application of the predetermined charging voltage to the protective capacitor is controlled by the internal control device.

In line with a further preferred development, the period is ascertained using the internal control device.

In line with a further preferred development, the resistance value is calculated using the internal control device in the subscriber line interface circuit, and the calculated resistance value is transmitted to the external control device.

In line with a further preferred development, the ascertained period is transmitted from the internal control device to the external control device, which subsequently calculates the resistance value.

In line with a further preferred development, an interrupt is generated by the subscriber line interface circuit when the measured voltage is the same as the threshold voltage, the interrupt being transmitted to the external control device, which ascertains the period and hence calculates the resistance value.

In line with a further preferred development, the charging voltage is predetermined using the internal control device or the external control device.

One advantage of this preferred development is that the charging voltage can be predetermined by various control devices.

Exemplary embodiments of the invention are illustrated in the drawings and are explained in more detail in the description below.

DETAILED DESCRIPTION

In all figures of the drawings, elements which are the same or have the same function have been provided with the same reference symbols—unless stated otherwise.

Although the present invention is described below with reference to subscriber line interface circuits or subscriber line interface systems, it is not limited thereto but rather can be used in a wide variety of ways.

Figure 1:
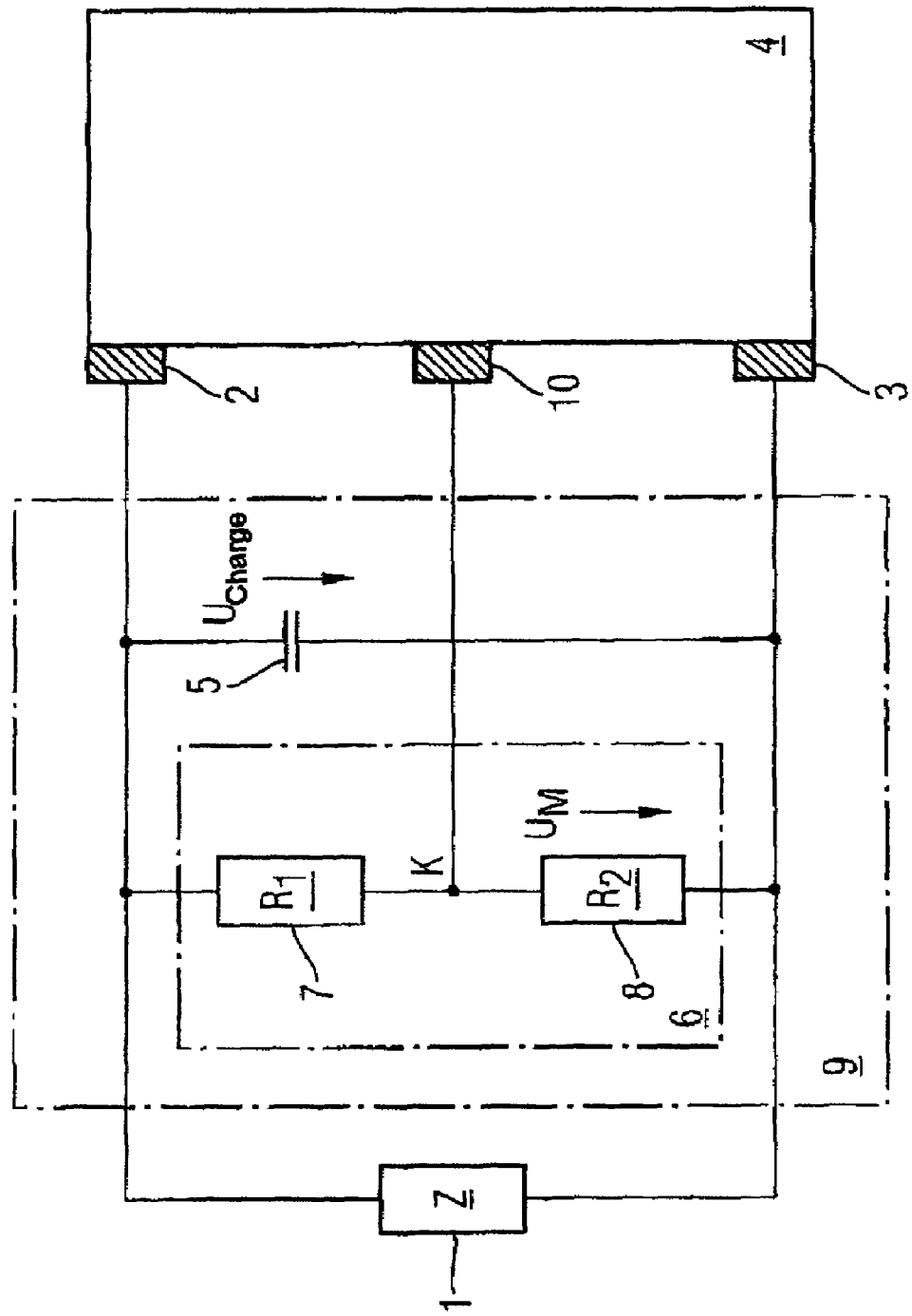
FIG. 1 shows a block diagram of a first measurement arrangement for measuring the resistance value in line with the invention.

FIG. 1 shows a block diagram of a first measurement arrangement for measuring the resistance value in line with the invention.

The resistance value to be measured is denoted by the reference symbol Z. In this and all subsequent block diagrams, reference symbol 1 denotes, as an alternative, the unknown resistance, which has the resistance value Z. The resistance 1 to be measured is connected to a subscriber line interface circuit 4 by means of a first contact 2 and a second contact 3 in the subscriber line interface circuit 4.

Connected in parallel with the resistance 1 is a protective capacitor 5. A voltage divider 6, which contains a first resistor 7 with a first resistance value $R_1$ and a second resistor 8 with a second resistance value $R_2$ connected in series, is connected in parallel with the protective capacitor 5.

The protective capacitor 5 and the voltage divider 6 connected in parallel therewith produce a protective circuit 9.

The protective circuit 9 and the resistance 1 in parallel therewith can be characterized, like any RC element, by means of a time constant T, the time constant T being formed by the product of the total resistance value $R_{tot}$ and the capacitance C of the protective capacitor 5.

$$T = R_{tot} \cdot C$$

In this case, the total resistance value $R_{tot}$ of the protective circuit 9 and of the resistance 1 which is in parallel therewith is calculated as follows:

$$R_{tot} = \frac{Z \cdot (R_1 + R_2)}{(Z + R_1 + R_2)}$$

Between the serially connected resistors (7, 8) there is a node K which is connected to the third contact 10 of the subscriber line interface circuit 4. It is thus possible to measure the measured voltage $U_M$ drop across the second resistor 8 between the third contact 10 and the second contact 3.

The measurement arrangement described above can be used to perform the following measurement method in line with the invention:

In a first step, a predetermined charging voltage $U_{Charge}$ is applied to the protective capacitor 5. By way of example, the capacitance of the protective capacitor 5 is 15 nF (C=15 nF) and the charging voltage $U_{Charge}$ is –50 V ($U_{Charge}$=–50 V), for example.

In a second step, a threshold voltage $U_{TH}$ is calculated on the basis of the first resistance value $R_1$, the second resistance value $R_2$ and the applied charging voltage $U_{Charge}$. The threshold voltage $U_{TH}$ is calculated on the basis of the geometry of the measurement arrangement shown in FIG. 1 using the formula below. In this case, it should be remembered that the threshold voltage $U_{TH}$ corresponds to the measured voltage $U_M$ when the time t corresponds to the time constant T of the protective circuit 9.

$$U_M(t) = \frac{R_2}{R_1 + R_2} \cdot U_{Charge} \cdot \exp\left(-\frac{t}{T}\right)$$

$$\begin{aligned} U_{TH} &= U_M(t = T) \\ &= \frac{R_2}{R_1 + R_2} \cdot U_{Charge} \exp\left(-\frac{T}{T}\right) \\ &= \frac{R_2}{R_1 + R_2} \cdot U_{Charge} \cdot 0.3679 \end{aligned}$$

By way of example, the typical values such as $R_1$=10 MΩ, $R_2$=47 kΩ and $U_c$=–50 V, a value of –86.05 mV is obtained for the threshold voltage $U_{TH}$.

In a subsequent step, the protective capacitor 5 is discharged, and at the same time a timer for ascertaining the period $\Delta t$ is started and the measured voltage $U_M$ drop across the second resistor 8 on account of the discharging operation in the protective capacitor 5 is measured. The period $\Delta t$ is measured between the start of the discharging of the protective capacitor 5 and the time when the measured voltage $U_M$ is the same as the threshold voltage $U_{TH}$.

The resistance value Z is calculated from the first resistance value $R_1$, from the second resistance value $R_2$ and from the recorded period $\Delta t$ using the two formulae below, where the time constant T needs to be set to be equal to the measured period $\Delta t$:

$$R_{tot} = \frac{T}{C}$$

$$Z = \frac{R_{tot} \cdot (R_1 + R_2)}{(R_1 + R_2 - R_{tot})}$$

Figure 2:
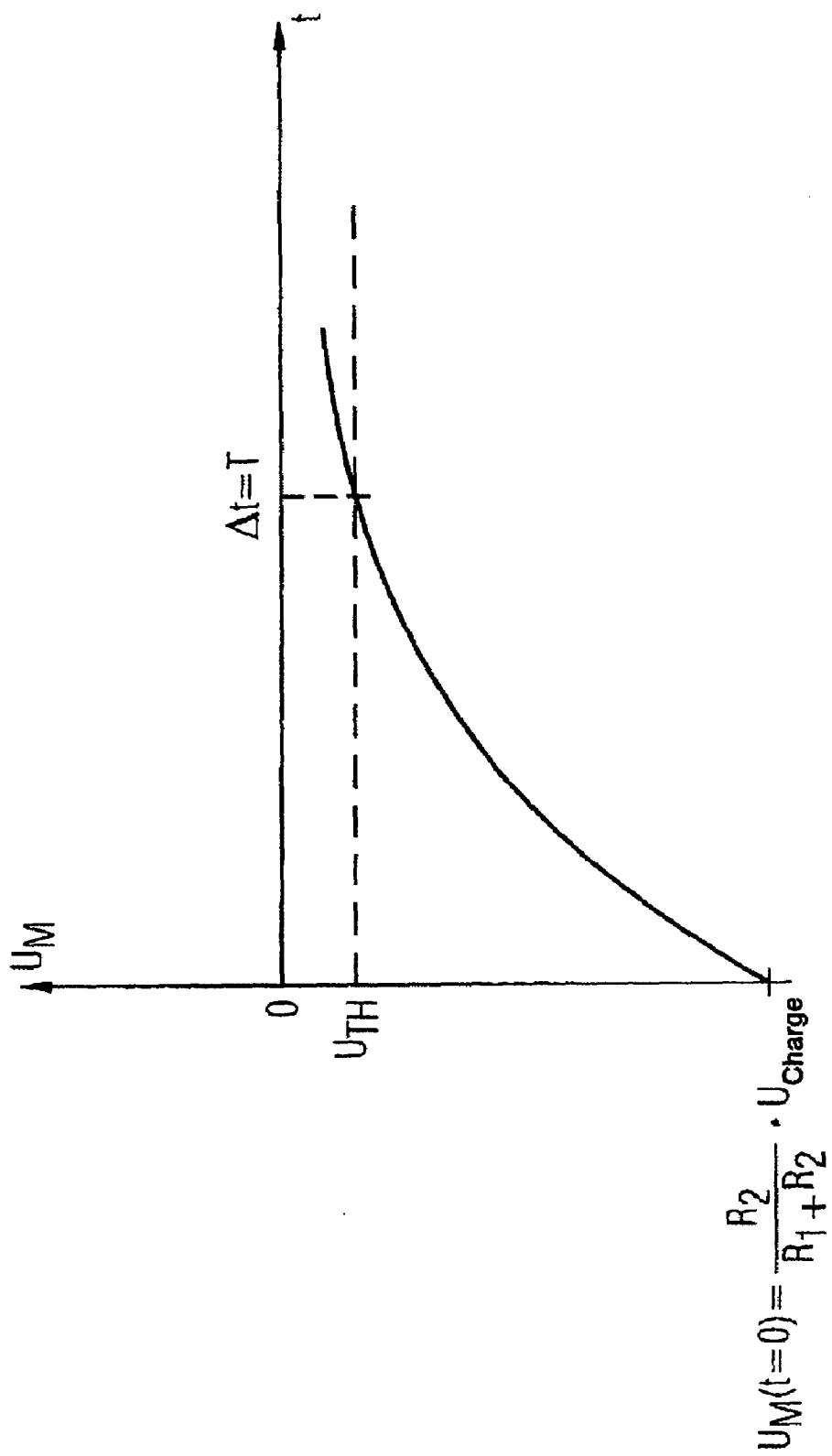
FIG. 2 shows the inventive measurement method over the discharging operation of the protective capacitor, using a U/t graph.

FIG. 2 shows the inventive measurement method over the discharging operation in the protective capacitor using a U/t graph.

The x axis in the U/t graph shown in FIG. 2 shows the time t for ascertaining the period Δt, which is started when the protective capacitor 5 starts to discharge.

The y axis of the U/t graph shown in FIG. 2 shows the time profile of the measured voltage $U_M(t)$.

At the time t=0, the measured voltage $U_M$ is:

$$U_M(t=0) = \frac{R_2}{R_1 + R_2} \cdot U_{Charge}$$

When the protective capacitor 5, which has the capacitance C, starts to discharge, the absolute value of the measured voltage $U_M$ is reduced on the basis of the exponential function exp $$\left(-\frac{t}{T}\right).$$

Once the absolute value of the measured voltage $U_M$ reaches the absolute value of the threshold voltage $U_{TH}$, the period Δt is recorded.

As FIG. 1 shows, the resistance value Z is calculated from the recorded period Δt, from the first resistance value $R_1$ and from the second resistance value $R_2$.

Figure 3:
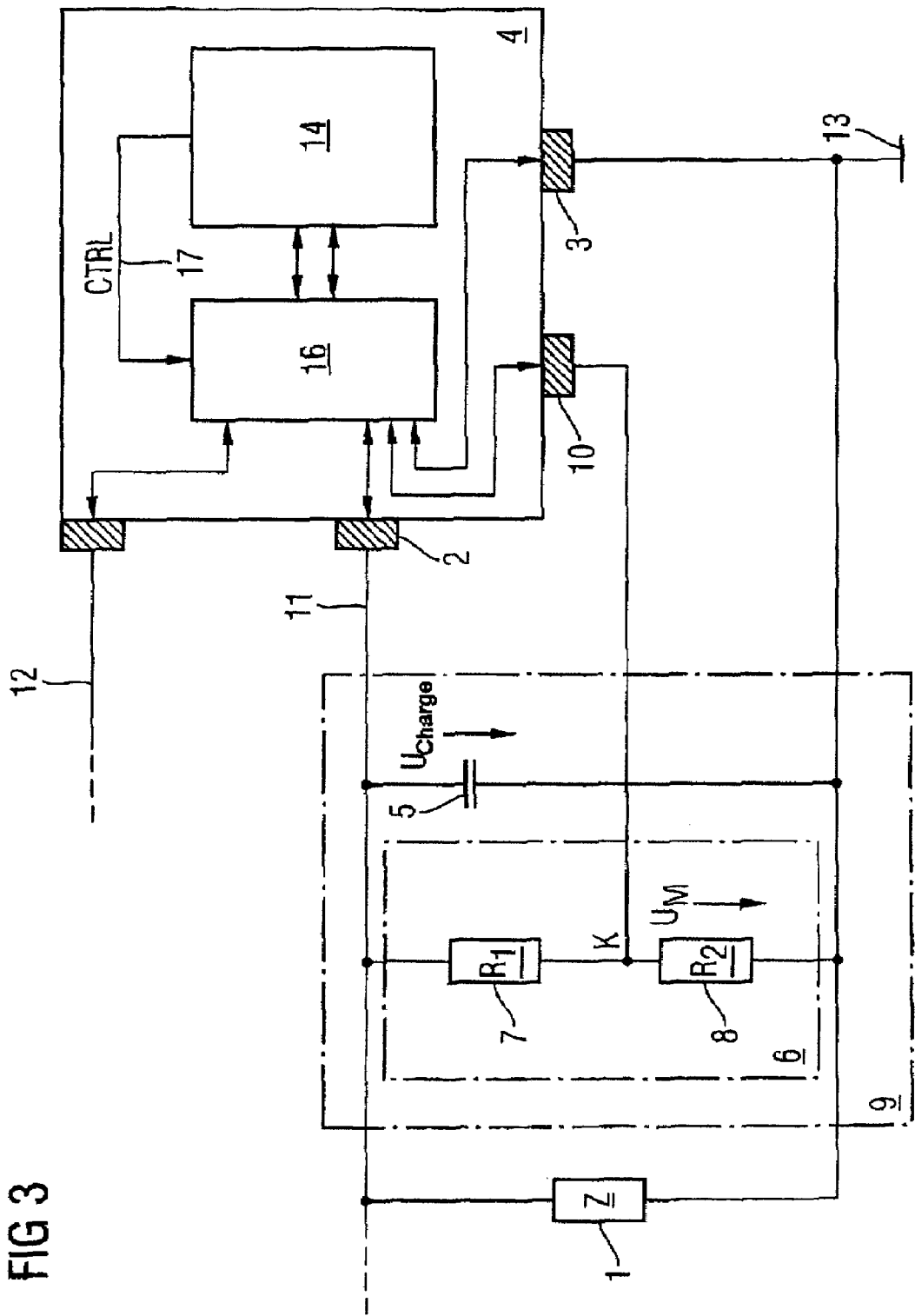
FIG. 3 shows a block diagram of a second measurement arrangement for measuring the resistance value between the ring wire in the subscriber line interface circuit and ground in line with the invention.

FIG. 3 shows a block diagram of a second measurement arrangement for measuring the resistance value between the ring wire in the subscriber line interface circuit and ground in line with the invention.

Referring to FIG. 3, the reference symbol 11 denotes the ring wire in the subscriber line interface circuit 4 and the reference symbol 13 denotes ground.

The first contact 2 connects the ring wire 11 to the subscriber line interface circuit 4, and the second contact 3 connects ground 13 to the subscriber line interface circuit 4, so that the resistance value Z between the ring wire 11 and ground 13 is ascertained using the method described above.

The subscriber line interface circuit 4 has an internal control device 14 which is used to calculate the threshold voltage $U_{TH}$, which is used to control the charging of the protective capacitor 5 with the predetermined charging voltage $U_{Charge}$, which is used to record the period Δt and which is used to calculate the resistance value Z.

In addition, the subscriber line interface circuit 4 has a multiplexer 16 which has the function of respectively connecting the line in question to the internal control device 14. The internal control device 14 controls the multiplexer 16 via a control line 17 using the control signal CTRL.

If, as shown in FIG. 3, it is necessary to measure the resistance value Z between the ring wire 11, connected by means of the first contact 2, and ground 13, connected by means of the second contact 3, then the multiplexer 16 for the time being connects the ring wire 11 and ground 13 to the internal control device 14, which controls the application of the predetermined charging voltage $U_{Charge}$ to the protective capacitor 5. To measure the measured voltage $U_M$ drop across the second resistor 8 at that time, instead of the ring wire 11 the line which is connected to the third contact 10 is connected to the internal control device 14 by the multiplexer 16.

Figure 4:
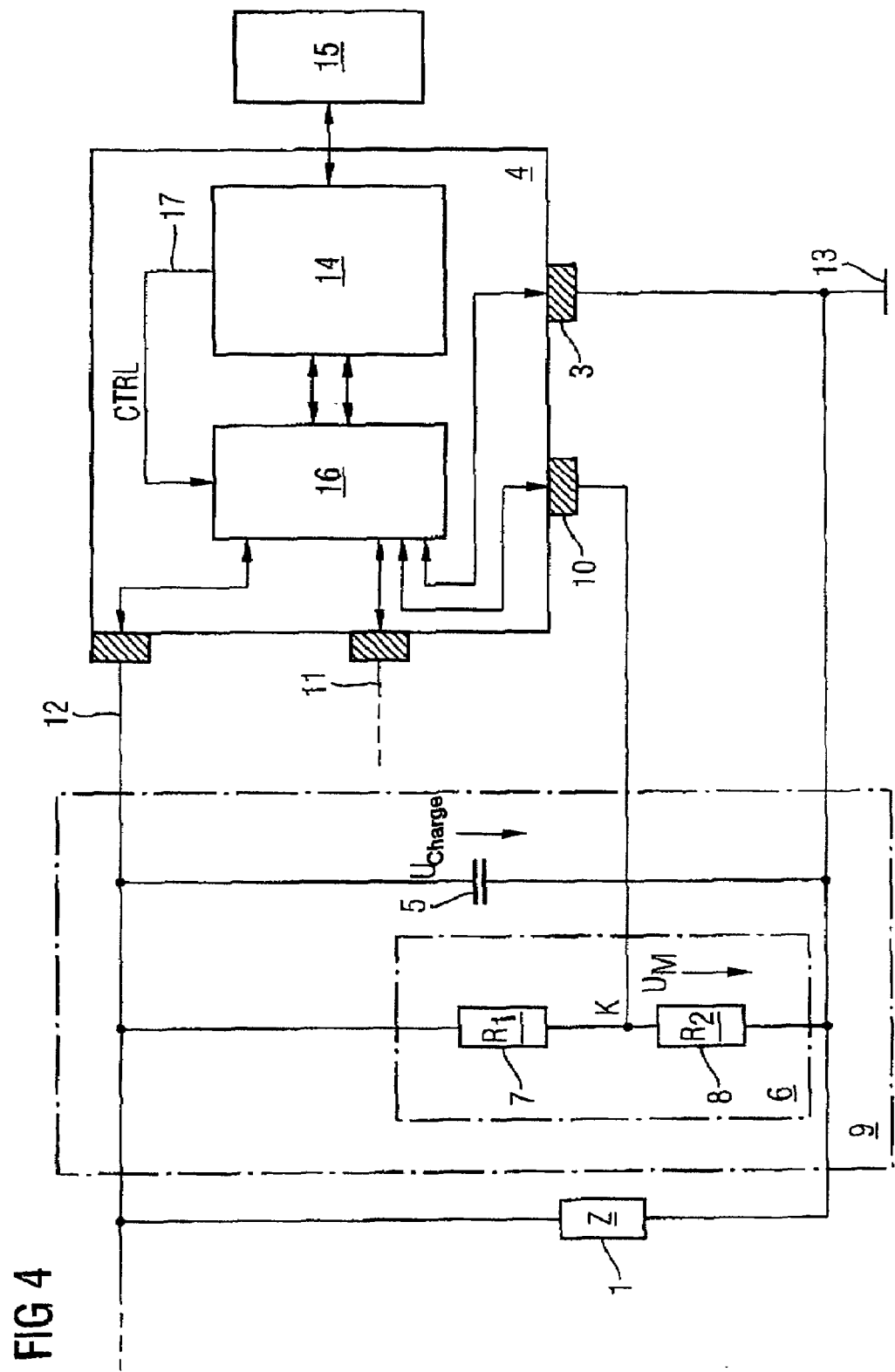
FIG. 4 shows a block diagram of a third measurement arrangement for measuring the resistance value between the tip wire in the subscriber line interface circuit and ground in line with the invention.

FIG. 4 shows a block diagram of a third measurement arrangement for measuring the resistance value between the tip wire in the subscriber line interface circuit and ground in line with the invention.

The protective circuit 9 is connected to the tip wire 12, which is connected to the first contact 2 in the subscriber line interface circuit 4, and to the second contact 3 in the subscriber line interface circuit 4, which is connected to ground 13. In the exemplary embodiment shown in FIG. 4, the multiplexer 16 has the function of connecting the tip wire 12 to the internal control device 14 while the protective capacitor 5 in the protective circuit 9 is being charged.

When the protective capacitor 5 starts to discharge, the line which is connected by means of the third contact 10 is connected to the internal control device 14 by means of the multiplexer 16, in a similar manner to in FIG. 3.

In addition, in the exemplary embodiment shown in FIG. 4, the internal control device 14 in the subscriber line interface circuit 4 is connected to an external control device 15.

Using the external control device 15, the threshold voltage $U_{TH}$ can be calculated, as with the internal control device 14 in the subscriber line interface circuit 4.

Alternatively, the internal control device 14 generates just an interrupt if the recorded measured voltage $U_M$ corresponds to the threshold voltage $U_{TH}$, in which case this interrupt is transmitted to the external control device 15, which ascertains the period Δt and hence the resistance value Z between the tip wire 12 and ground 13.

The charging voltage $U_{Charge}$ can be predetermined either by the internal control device 14 in the subscriber line interface circuit 4 or by the external control device 15.

Figure 5:
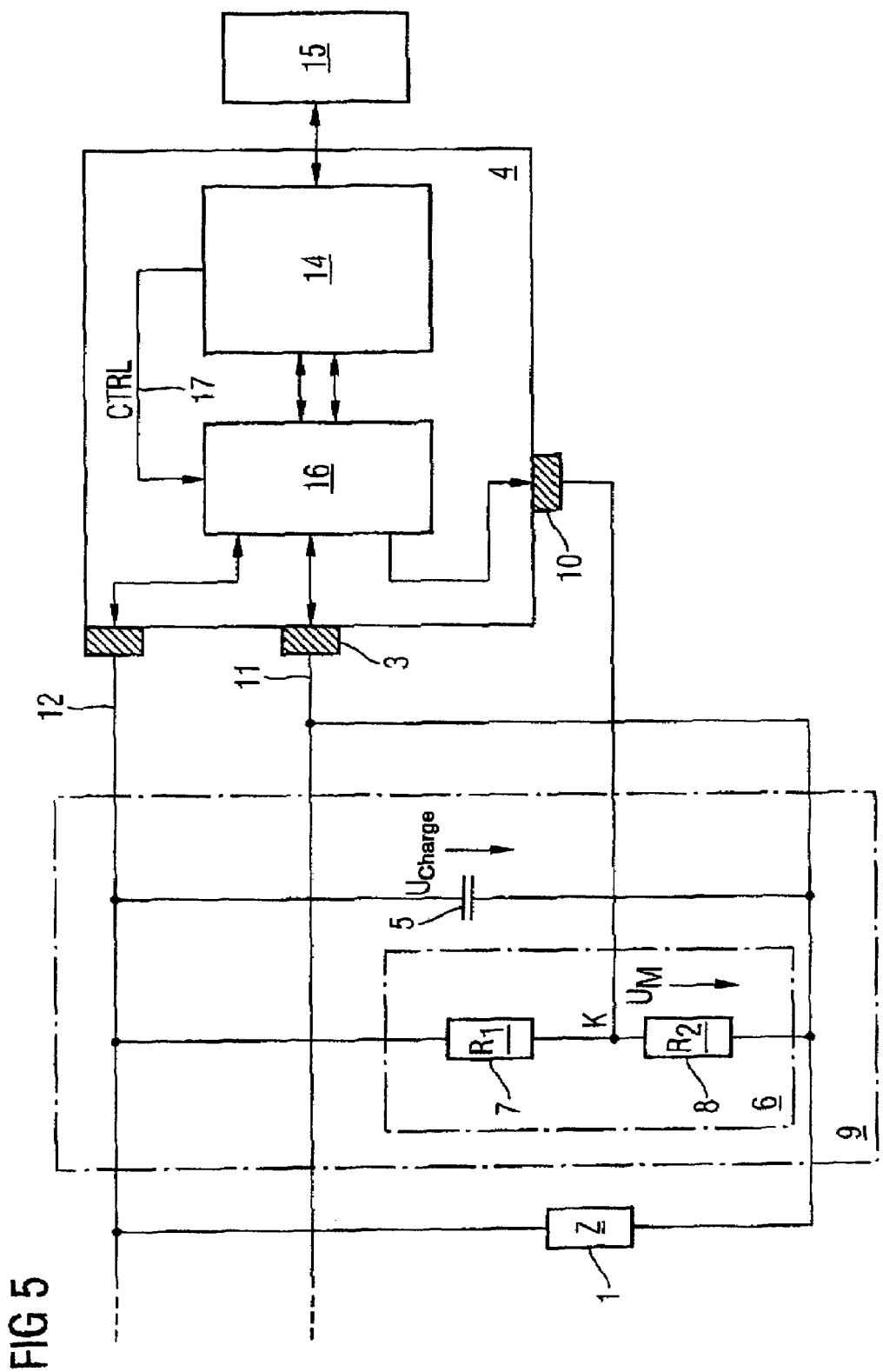
FIG. 5 shows a block diagram of a fourth measurement arrangement for measuring the resistance value between the tip wire and the ring wire in the subscriber line interface circuit in line with the invention.

FIG. 5 shows a block diagram of a fourth measurement arrangement for measuring the resistance value Z between the tip wire and the ring wire in the subscriber line interface circuit in line with the invention.

FIG. 5 differs from the exemplary embodiment shown in FIG. 4 only in that the protective circuit 9 is not connected between the tip wire 12 and ground 13, as in FIG. 4, but rather in that the protective circuit 9 is connected between the tip wire 12 and the ring wire 11, so that the resistance value Z between the tip wire 12 and the ring wire 11 can be measured.

Although the present invention has been described above with reference to preferred exemplary embodiments, it is not limited thereto but rather can be modified in a wide variety of ways.

The invention claimed is:

1. A method for ascertaining a resistance value between a first contact and a second contact in a subscriber line interface circuit, where a protective circuit for protecting the subscriber line interface circuit against overvoltages is provided between the two contacts and comprises a parallel circuit including a protective capacitor connected in parallel with two resistors connected in series via a node, the node being connected to a third contact in the subscriber line interface circuit, where the method has the following steps:

a) a predetermined charging voltage is applied to the protective capacitor;

b) a threshold voltage is calculated on the basis of the resistance values of the two resistors and the applied charging voltage;

c) a measured voltage tapped off across one of the two resistors is measured while the protective capacitor is discharging;
d) the measured voltage is compared with the calculated threshold voltage;
e) a period between the start of the discharging of the protective capacitor and the time at which the measured voltage is the same as the threshold voltage is ascertained; and
f) the resistance value is calculated using the ascertained period and the resistance values of the two resistors.

2. The method as claimed in claim 1,
wherein
the first contact connects a tip wire and the second contact connects a ring wire to the subscriber line interface circuit, so that the resistance value between the ring wire and the tip wire is determined.

3. The method as claimed in claim 1,
wherein
the first contact connects the ring wire and the second contact connects ground to the subscriber line interface circuit, so that the resistance value between the ring wire and ground is determined.

4. The method as claimed in claim 1,
wherein
the first contact connects the tip wire and the second contact connects ground to the subscriber line interface circuit, so that the resistance value between the tip wire and ground is determined.

5. The method as claimed in claim 1,
wherein
the threshold voltage is calculated using an internal control device internal to the subscriber line interface circuit or an external control device external to the subscriber line interface circuit.

6. The method as claimed in claim 5,
wherein
the application of the predetermined charging voltage to the protective capacitor is controlled by the internal control device of the subscriber line interface circuit.

7. The method as claimed in claim 5,
wherein
the period is ascertained using the internal control device of the subscriber line interface circuit.

8. The method as claimed in claim 5,
wherein
the resistance value is calculated using the internal control device, and the calculated resistance value is transmitted to the external control device.

9. The method as claimed in claim 5,
wherein
the ascertained period is transmitted from the internal control device to the external control device, which subsequently calculates the resistance value.

10. The method as claimed in claim 5,
wherein
an interrupt is generated by the subscriber line interface circuit when the measured voltage is the same as the threshold voltage, the interrupt being transmitted to the external control device, which ascertains the period and hence calculates the resistance value.

11. The method as claimed in claim 5,
wherein
the charging voltage is predetermined using the internal control device or the external control device.

* * * * *